(12) United States Patent
Skala

(10) Patent No.: US 8,679,697 B1
(45) Date of Patent: Mar. 25, 2014

(54) COMPRESSIBLE FUEL CELL SUBGASKET WITH INTEGRATED SEAL

(75) Inventor: Glenn W. Skala, Churchville, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 48 days.

(21) Appl. No.: 13/599,563

(22) Filed: Aug. 30, 2012

(51) Int. Cl.
*H01M 8/04* (2006.01)
*H01M 8/10* (2006.01)

(52) U.S. Cl.
USPC ............................ 429/460; 429/508; 429/509

(58) Field of Classification Search
USPC ........................................................ 429/460
See application file for complete search history.

(56) References Cited

U.S. PATENT DOCUMENTS

| | | | |
|---|---|---|---|
| 7,138,202 B2 * | 11/2006 | Frank et al. | 429/535 |
| 7,883,814 B2 * | 2/2011 | Watanabe et al. | 429/460 |
| 7,892,692 B2 | 2/2011 | Beutel | |
| 8,097,379 B2 * | 1/2012 | Suenaga et al. | 429/460 |
| 8,609,298 B2 * | 12/2013 | Skala et al. | 429/508 |
| 2010/0159294 A1 | 6/2010 | Fly et al. | |

* cited by examiner

*Primary Examiner* — John S Maples
(74) *Attorney, Agent, or Firm* — Dinsmore & Shohl LLP

(57) ABSTRACT

Fuel cell subgaskets made of extrusion based, microcellular polymeric foam; fuel cell stacks comprising the provided subgaskets; methods of sealing between plates of a fuel cell stack using the provided subgaskets; and methods of manufacturing such subgaskets.

10 Claims, 7 Drawing Sheets

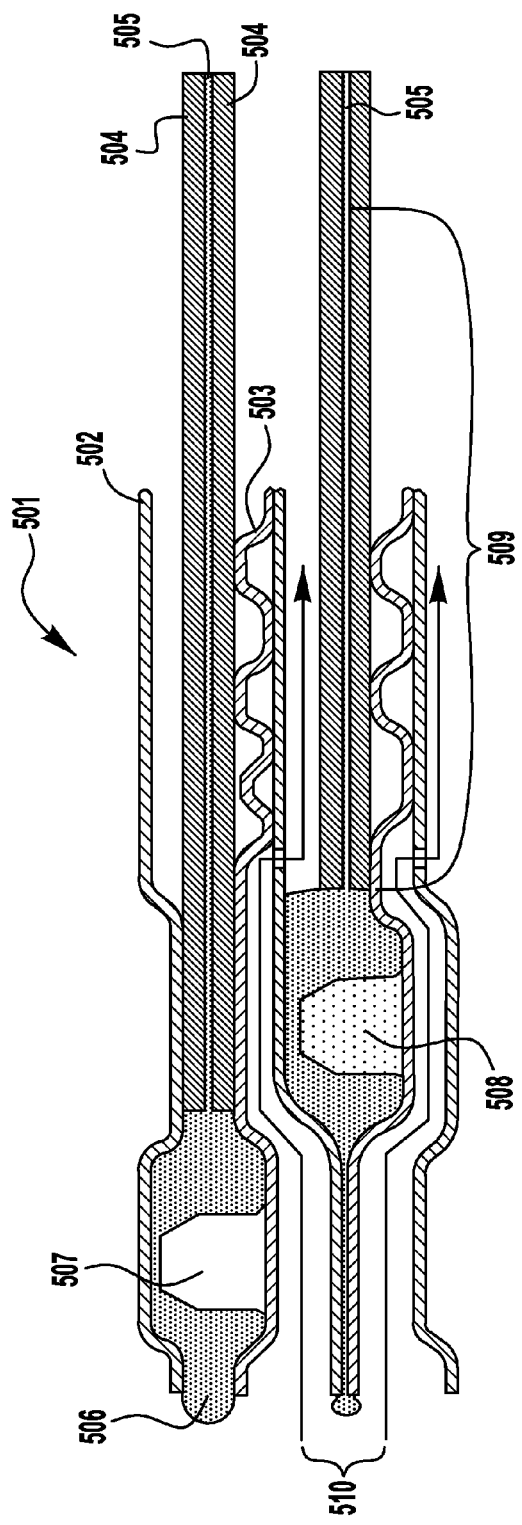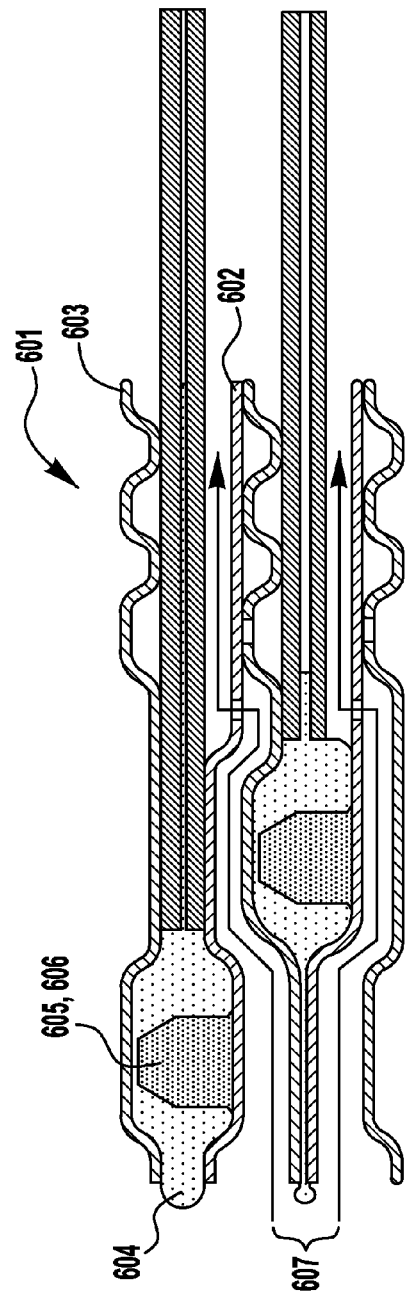

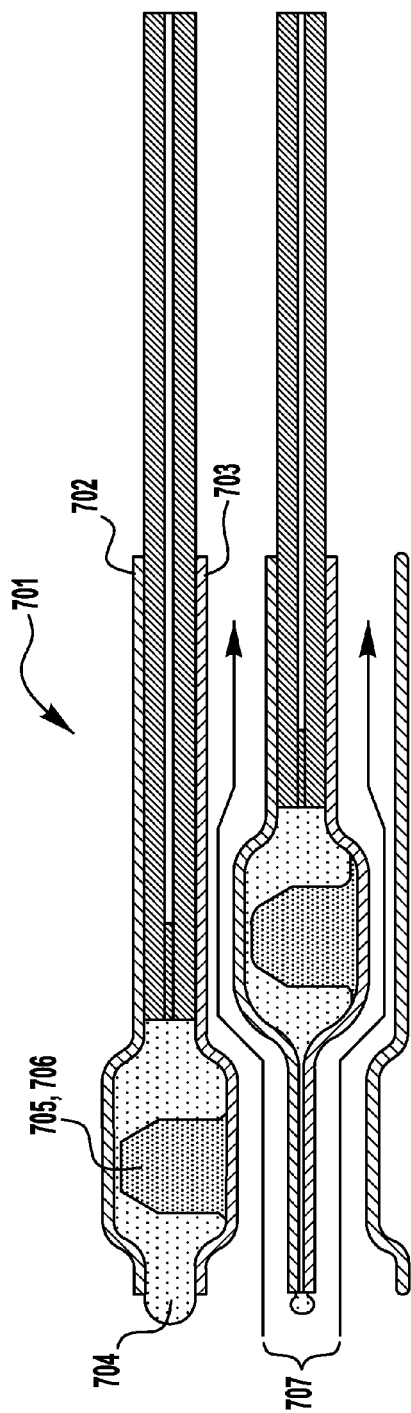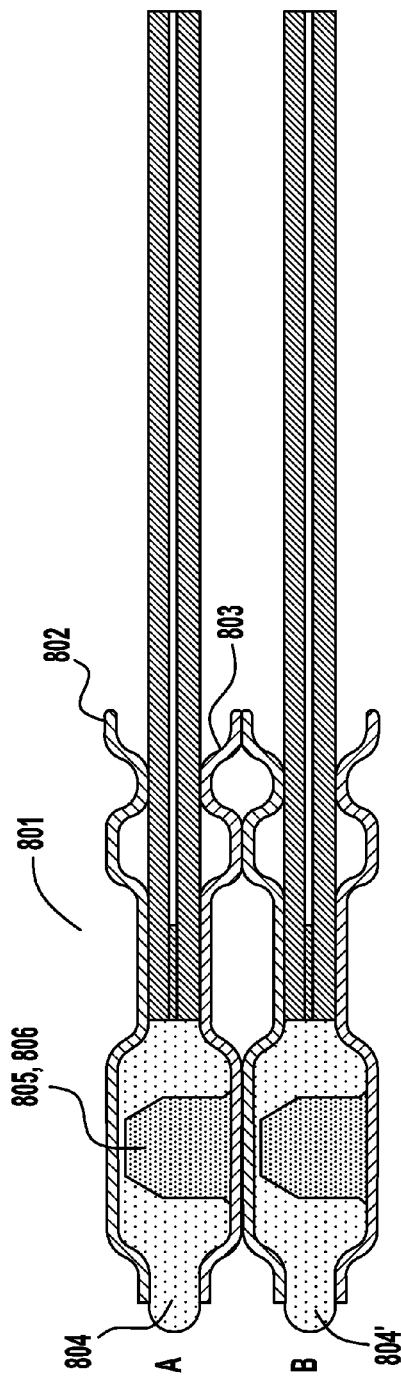

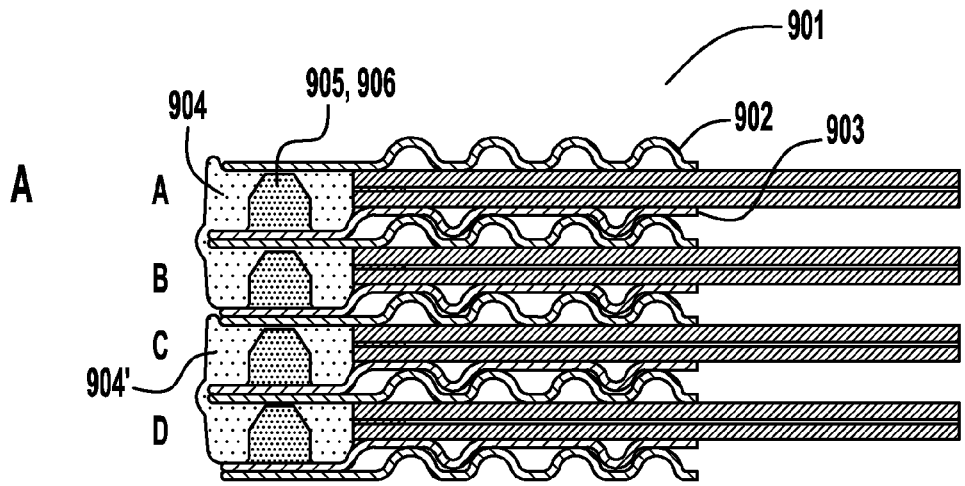
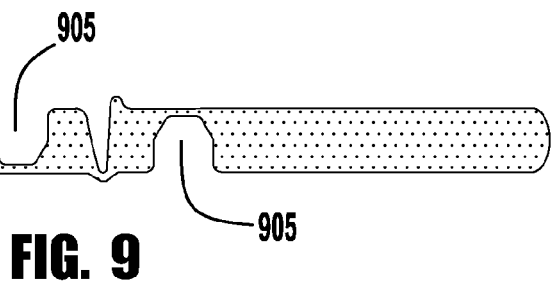
FIG. 9
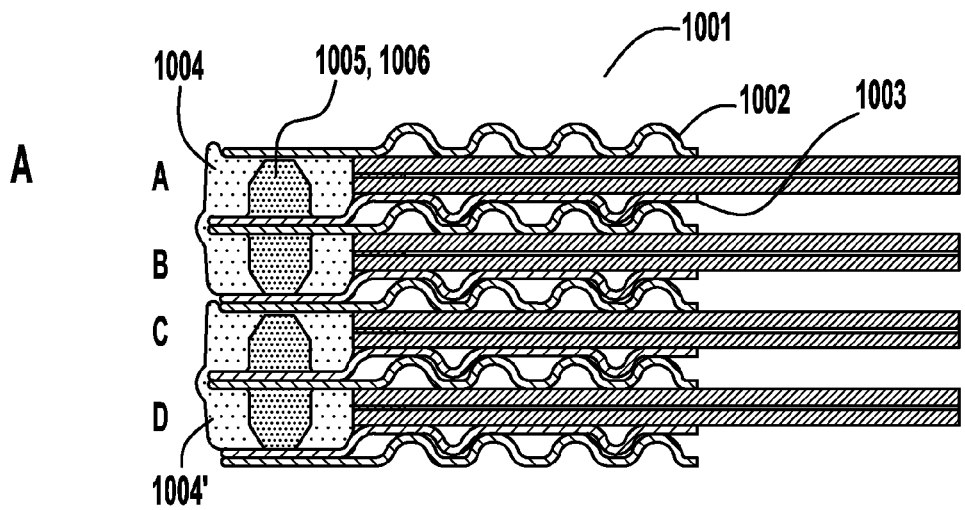
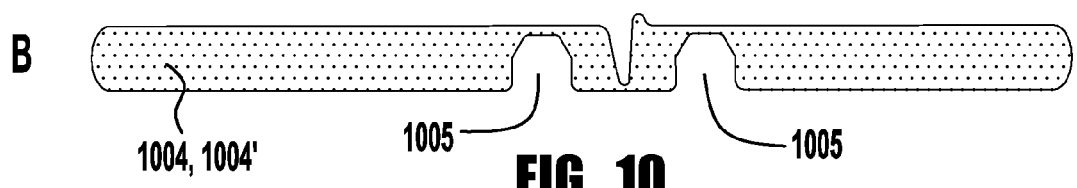
FIG. 10

COMPRESSIBLE FUEL CELL SUBGASKET WITH INTEGRATED SEAL

FIELD

This application relates to fuel cells and fuel cell stacks, and more particularly, to subgaskets for fuel cells.

BACKGROUND

Electrochemical conversion cells, commonly referred to as fuel cells, produce electrical energy by processing first and second reactants. Typically, this is through oxidation of hydrogen and reduction of oxygen, but fuel cells utilizing other reactants (for example, hydrocarbon gas) are also known. By way of illustration and not limitation, one typical type of fuel cell comprises a polymer membrane (e.g., a proton exchange membrane) disposed between a cathode and an anode to form a membrane electrode assembly (MEA). The MEA is positioned between a pair of gas diffusion media layers, and these components are positioned between a cathode plate and an anode plate to form a single cell.

The voltage provided by a single cell is typically too small for many applications, such as powering a vehicle. Therefore, in order to provide for a more suitable quantity of voltage, a plurality of individual cells is typically configured into a "stack." In such configuration, electrically conductive bipolar plates are positioned between the anode side diffusion layer of one cell and the cathode side diffusion layer of an adjacent cell. The bipolar plates separating adjacent cells serve as current collectors and have opposing surfaces—one surface defining a flow path for conveying fuel (for example, hydrogen or hydrocarbon) to the anode of one cell, and one surfaced defining a flow path for conveying oxidant (for example, oxygen or air) to the cathode of an adjacent cell. Each bipolar plate also has a flow path defined therein for conveying coolant.

The various flow paths of a bipolar plate are connected to corresponding manifolds defined within the plate. For example, the fuel flow path is typically connected to two fuel manifolds, and the oxidant flow path is typically connected to two oxidant manifolds. However, the cross-sectional area of a flow path is significantly smaller than that of a manifold. Accordingly, reactant/coolant flow rates and pressures rise upon entry into a flow path from the manifold. To mitigate against leakage of high pressure reactants and coolant from the fuel cell stack, seals (comprising a seal bead and subgasket) are typically formed between each bipolar plate, and the stack is compressed. Good results have been achieved using elastomeric seal bead materials and thin film polymer subgasket materials that are compatible with the fuel cell environment. Nevertheless, there remains a continuing need for improved ways of sealing between bipolar plates, particularly those that can reduce the complexity and cost of manufacturing fuel cell stacks.

SUMMARY

The present disclosure provides, in various embodiments, fuel cell subgaskets made of extrusion based, microcellular polymeric foam; fuel cell stacks comprising the provided subgaskets; methods of sealing between plates of a fuel cell stack using the provided subgaskets; and methods of manufacturing such subgaskets.

Among the various disclosed embodiments, provided are microcellular polymeric foam subgaskets for fuel cells. Such subgaskets may, in some embodiments, comprise (i) an active region that is configured to frame a membrane electrode assembly when assembled therewith between a pair of fuel cell plates; (ii) a feed region comprising a manifold portion that conforms to anode, cathode, and coolant manifolds of the pair of plates; and (iii) at least one seal bead channel integrated into the polymeric foam and configured to receive and contain a seal bead material.

Also provided among the various disclosed embodiments are fuel cell stacks comprising a provided subgasket. In some embodiments, such fuel cell stacks may comprise (i) a pair of plates disposed in a stack; (ii) a membrane electrode assembly disposed between the pair of plates; (iii) an extrusion based, microcellular polymeric foam subgasket disposed between the pair of plates, the subgasket comprising at least one seal bead channel integrated into the polymeric foam and configured to receive and contain a seal bead material; and (iv) a cured seal bead disposed in the at least one seal bead channel. The cured seal bead may be formed by depositing a seal bead material into the channel before disposing the subgasket between the pair of plates, after disposing the subgasket between the pair of plates, or both, and curing the seal bead material.

Additionally provided among the various disclosed embodiments are methods of sealing between plates of a fuel cell stack. Such methods may comprise (i) providing a pair of plates disposed in a stack; (ii) providing a membrane electrode assembly; (iii) providing an extrusion based, microcellular polymeric foam subgasket comprising (a) an active region that is configured to frame the membrane electrode assembly; and (b) at least one seal bead channel integrated into the polymeric foam and configured to receive and contain a seal bead material; (iv) disposing the provided subgasket and membrane electrode assembly between the pair of plates such that the membrane electrode assembly is framed by the active region of the subgasket; and (v) depositing a seal bead material into the at least one seal bead channel before disposing the subgasket between the pair of plates, after disposing the subgasket between the pair of plates, or both.

Among the various disclosed embodiments, also provided are methods of manufacturing a subgasket for a fuel cell. Said methods may comprise (i) providing an extrusion based, microcellular polymeric foam sheet; (ii) heating the provided sheet to a pliable temperature; (iii) molding the sheet to at least have (a) an active region comprising a removable portion; (b) a feed region that conforms to the anode, cathode, and coolant manifolds of a pair of plates of the fuel cell, the feed region comprising a plurality of removable portions; and (c) at least one seal bead channel integrated into the polymeric foam and configured to receive and contain a seal bead material. The provided sheet may also be cross-linked before or after removing the removable portions.

BRIEF DESCRIPTION OF THE DRAWINGS

A more complete appreciation of the many embodiments of the present disclosure will be readily obtained as the same becomes better understood by reference to the following detailed description when considered in connection with the accompanying drawings, wherein:

FIG. 5 is a fragmentary side cross-sectional view of an anode feed section of an exemplary fuel cell stack, shown with the plate to illustrate assembly with a subgasket, wherein the arrows illustrate the anode gas flowplath. Section A-A in FIG. 2 illustrates one example of where an anode feed section may be found on a fuel cell stack;

FIG. 6 is a fragmentary side cross-sectional view of cathode feed section of an exemplary fuel cell stack, shown with the plate to illustrate assembly with a subgasket, wherein the arrows illustrate the cathode gas flowplath. Section B-B in FIG. 2 illustrates one example of where a cathode feed section may be found on a fuel cell stack;

FIG. 7 is a fragmentary side cross-sectional view of a coolant feed section of an exemplary fuel cell stack, shown with the plate to illustrate assembly with a subgasket, wherein the arrows illustrate the coolant flowplath. Section C-C in FIG. 2 illustrates one example of where a coolant feed section may be found on a fuel cell stack;

FIG. 8 is a fragmentary side cross-sectional view of an edge section (non-nested design) of an exemplary fuel cell stack, shown with the plate to illustrate assembly with a subgasket. Section D-D in FIG. 2 illustrates one example of where an edge section may be found on a fuel cell stack;

FIG. 9 shows A, a fragmentary side cross-sectional view of an edge section (nested design with fan-folded subgasket having seal bead cavities on opposite sides of subgasket) of an exemplary fuel cell stack; and B, a fragmentary side cross-sectional view of a subgasket (in unfolded configuration) for use therewith;

FIG. 10 shows A, a fragmentary side cross-sectional view of an edge section (nested design with fan-folded subgasket having seal bead cavities on the same side of subgasket) of an exemplary fuel cell stack; and B, a fragmentary side cross-sectional view of a subgasket (in unfolded configuration) for use therewith.

DETAILED DESCRIPTION

Specific embodiments of the present disclosure will now be described. The invention may, however, be embodied in different forms and should not be construed as limited to the embodiments set forth herein. Rather, these embodiments are provided so that this disclosure will be thorough and complete, and will fully convey the scope of the invention to those skilled in the art.

Unless otherwise defined, all technical and scientific terms used herein have the same meaning as commonly understood by one of ordinary skill in the art to which this invention belongs. The terminology used in the description of the invention herein is for describing particular embodiments only and is not intended to be limiting of the invention. As used in the specification and appended claims, the singular forms "a," "an," and "the" are intended to include the plural forms as well, unless the context clearly indicates otherwise.

Unless otherwise indicated, all numbers expressing quantities, properties, conditions, and so forth as used in the specification and claims are to be understood as being modified in all instances by the term "about." Additionally, the disclosure of any ranges in the specification and claims are to be understood as including the range itself and also anything subsumed therein, as well as endpoints. Unless otherwise indicated, the numerical properties set forth in the specification and claims are approximations that may vary depending on the desired properties sought to be obtained in embodiments of the present invention. Notwithstanding that numerical ranges and parameters setting forth the broad scope of the invention are approximations, the numerical values set forth in the specific examples are reported as precisely as possible. Any numerical values, however, inherently contain certain errors necessarily resulting from error found in their respective measurements.

In various embodiments, the present disclosure provides fuel cell subgaskets made of extrusion based, microcellular polymeric foam; fuel cell stacks comprising the provided subgaskets; methods of sealing between plates of a fuel cell stack using the provided subgaskets; and methods of manufacturing such subgaskets.

Figure 1:
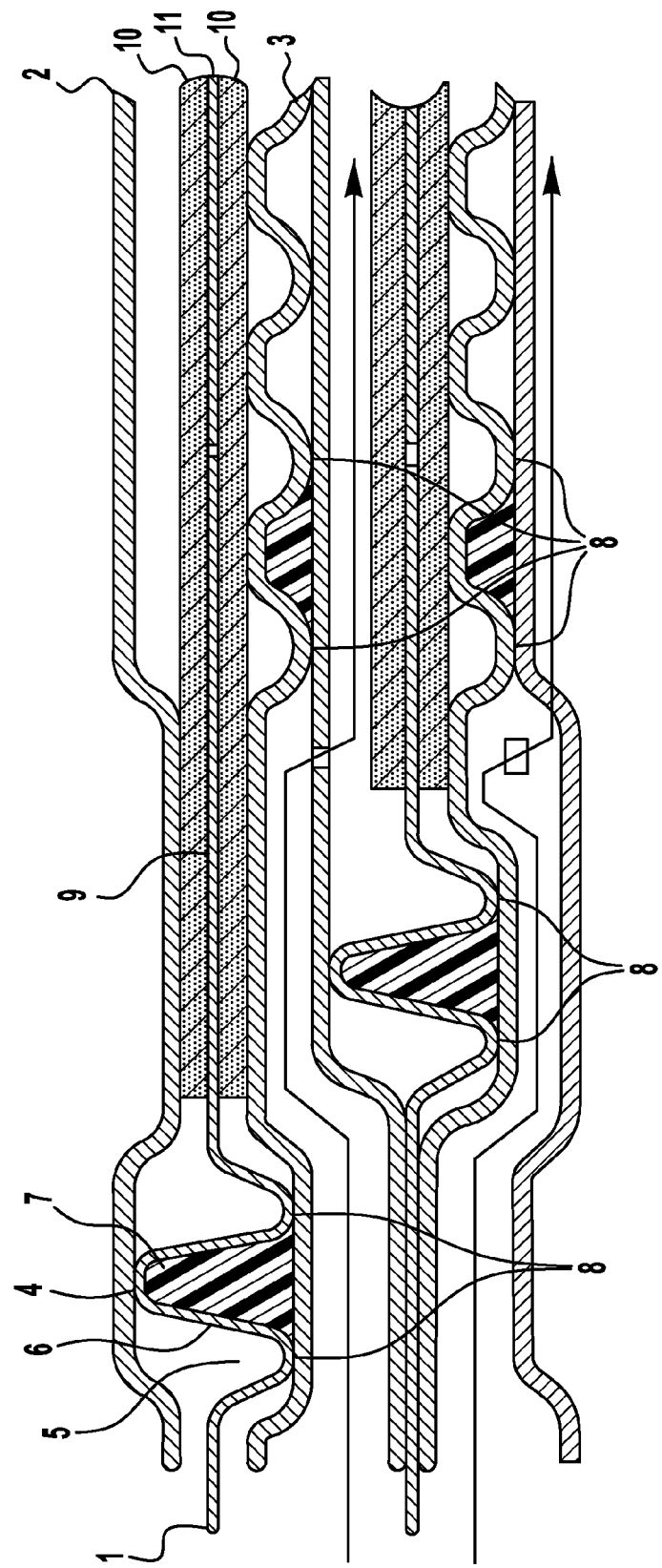
FIG. 1 is a fragmentary side cross-sectional view of an anode feed section of an exemplary prior art fuel cell stack, shown with the plate to illustrate assembly with a subgasket, wherein the arrows illustrate the anode gas flowplath.

Conventional fuel cells comprise subgaskets that are made of molded plastic films, which have advantages of low weight, corrosion-resistance, and relatively easy processing. Such subgaskets are formed of a polymer film material, wherein the polymer is solid or foamed. However, to achieve a seal, the film itself must be molded (at least in part) into shapes that, in combination with biopolar plates, form features of a fuel cell design. For example, as shown in FIG. 1, a portion of a film 1 to be disposed between bipolar plates 2, 3 may be molded to be a peak 4, a trough 5, or a combination thereof, whereas another portion 9 is molded to be disposable between diffusion media 10 and abutt a MEA 11. When placed against a bipolar plate 3, such molded (tortuous) portion of the film/subgasket 1 forms a cavity 6 that can be filled with a sealant that will form a seal bead 7 upon curing. Importantly, because the film/subgasket 1 must itself be deformed from a substantially planar conformation in order to form such a tortuous portion, voids necessary exist between the film/subgasket 1 and the bipolar plates 2, 3, such as above the troughs 5. Additionally, it is necessary to affix the film/subgasket 1 to at least one plate 2, 3 in order to reduce leakage of sealant material from the cavity 6 formed. For example, the film/subgasket 1 may have heat stakes 8 to adhere it to a plate 2, 3 and further define the cavity 6.

During assembly of a conventional stack using such a subgasket 1, sealing of a cell is achieved using a multi-step process involving forming the cavity 6 and filling it with a sealant to form a seal bead 7. In such process, the tortuous portion (having the peak 4, troughs 5, and cavity 6) of the film/subgasket is fabricated by a thermoforming process, such as match molding, wherein the film/subgasket 1 is heated to just below or above a melting point, and squeezing the film 1 between a positive and negative mold. The thermoformed subgasket 1 is then positioned between the plates 2, 3 with the tortuous form portion abutting each of the plates 2, 3. Next, the film/subgasket 1 is affixed to the plate 2, 3, and the sealant material is injected to substantially fill the cavity 6. Prior to injecting, the cavity 6 may be partially compressed by at least partial compression of the stack. Upon relieving such compression (if any), the sealant expands within the cavity 6 causing it to grow to an uncompressed height. Following curing of the sealant to form the seal bead 7, the stack may be fully compressed, thereby sealing the cell.

In contrast to conventional fuel cells, the provided fuel cells comprise subgaskets that are made of foamed thermoplastic material (not a membrane or film) that is thermoformed to have seal bead channels integrated into the subgasket. Thus, instead of the subgasket being deformed from a substantially planar conformation (as is required with a conventional membrane/film), an integrated channel is instead formed within the foamed plastic itself. The foam itself acts a mold for, and helps to support, the seal bead. By having features integrated into the subgasket (rather than deforming portions of the subgasket to form a feature), the subgasket retains a more planar conformation, has fewer (if any) voids between it and the bipolar plates, and is not required to be affixed to a bipolar plate in order to form a seal bead channel. Additionally, the foamed plastic used in the provided fuel cells can conform to the design features of the bipolar plates and, in some embodiments, be molded to have a variety of thicknesses. For example, in some regions, it may be desirable to have a thin and dense region (such as 100% density; solid polymer) while other regions may be thick and low density (such as 5-7% density; foam polymer). Thus, the provided subgaskets provide greater design freedom for fuel cells because tight tolerances (for example, 50 µm thickness) are achievable and because some fuel cell features (such as peak and trough combinations) are not required.

Although use of non-film foamed plastic allows for ease of molding, the foam must still have sufficient strength to handle loads resulting from seal bead compression, differential fluid pressures, or combinations thereof. Additionally, the compression stiffness of the foam needs to be sufficiently low such that the bipolar plates are not significantly deformed during compression. However, the compression stiffness also needs to be sufficiently high to handle manufacturing, assembly, and operating loads. Good results have been achieved using an extrusion based, microcellular polymeric foam (such as that formed by the so-called MuCell™ microcellular foaming process; Trexel, Inc.).

Microcellular foaming processes (such as the MuCell™ process; Trexel, Inc.) involves plasticizing the polymeric material to be foamed in an extrusion machine, introducing a foaming agent (which can be a physical or chemical foaming agent) into the machine at a temperature and pressure at which it is a supercritical fluid, and forming a single-phase mixture of the plasticized material and the supercritical fluid. A microcellular foamed plastic is formed when the foaming agent is released upon change of temperature and pressure of the single-phase mixture, such as when the mixture is extruded into the atmosphere while shaping. The microcellular foam formed has fine, uniform pores that may be closed-cell structures or open-cell structures, depending upon the foaming conditions used. Nucleating agents may also be used in the mixture to control cell size and uniformity. One of skill familiar with microcellular foaming processes will know that a variety of variations and refinements to the process and foamed plastics resulting therefrom have been made. The skilled artisan will also understand that variations and improvements to the process and resulting materials are contemplated to be encompassed within the terms "MuCell™ process," "microcellular foaming process," "microcellular foam," and "microcellular polymeric foam," as used herein.

A variety of polymeric materials are suitable for use with microcellular foaming processes. For example, polyolefins, polyesters, polycarbonates, polyamides, polyimides, polyethers, polystyrenes, polyurethanes, polyether ketones, polyvinyl chlorides, ply(meth)acrylates, poly(meth)acrylamides, poly(meth)acrylnitrile, polysulfones, polyphenylene sulfides, and phenolic resin polymers have been used. In some embodiments, polymeric materials used to form the microcellular polymeric foam of the provided subgaskets are selected from polyethylene and polypropylene. For fuel cells operating at temperatures greater than 95° C., it may be desirable to cross-link the polymer.

For use in forming the provided subgaskets, the microcellular polymeric foam is formed into thin sheets having a density that provides the ability to squeeze the sheet to near solid polymer (100% dense) at a thickness compatible with the subgasket overlap region (for example, 50 µm) or seal bead contact strip (for example, 50-150 µm), while providing sufficient strength in such regions and elsewhere in the subgasket to handle loads resulting from seal bead compression, differential fluid pressures, or both. In some embodiments, a suitable foam sheet is one having a thickness (or a combination of thicknesses) of from about 0.5 mm to about 1.5 mm and a density of from about 5% to about 7%. Accordingly, foam sheets having a thickness of 0.5-0.6 mm, 0.6-0.7 mm, 0.7-0.8 mm, 0.8-0.9 mm, 0.9-1.0 mm, 1.0-1.1 mm, 1.1-1.2 mm, 1.2-1.3 mm, 1.3-1.4 mm, and 1.4-1.5 mm are specifically contemplated. In some embodiments, Foam sheets having a thickness (or combination of thicknesses) of from about 0.75 mm to about 1.2 mm are also contemplated to be suitable. Additionally, foam sheets having a density of 5-5.5%, 5.5-6%, 6-6.5%, and 6.5-7% are also specifically contemplated. The foam sheet may have microcellular (for example, 2-30 µm diameter) open or closed cells, but closed cells are preferred. In some embodiments, the microcellular polymeric foam sheet may be thinner in high stress areas (such as seal bead channels, overlap regions, and feed regions) to better distribute stress. In some embodiments, cross-linking the polymer may also help to achieve a more stable subgasket.

To make the provided subgaskets, a suitable microcellular polymeric foam sheet is thermoformed by heating the sheet to a pliable forming temperature, molding it to have the specific shape and design features (such as integrated seal bead channels) desired, and trimming it. Once thermoformed, the required openings (such as header portion openings, active area window, port holes, and datum holes) are punched out and the offal is disposed of. Preferably, a non cross-linked polymer sheet is thermoformed, thereby enabling the offal to be recycled.

Once a subgasket having the required design features (including integrated seal bead channels) is formed, the sealant material may optionally be deposited into the seal bead channels when the subgasket is outside of the stack. The sealant material may be a substantially self-leveling material, or may be a higher viscosity material requiring it to be forced into the seal bead channels. One of skill will be familiar with a variety of suitable sealants. Whether a high viscosity or lower viscosity material is used, enough sealant material would need to be deposited to substantially fill the channel. In some embodiments, sealant material is deposited in at least some seal bead channels outside of the stack and allowed to cure.

Whether or not a seal bead has been formed outside of the stack, the subgasket and MEA may be integrated. Having a thin (for example, 50 µm) compressible overlap region in the provided subgaskets allows for simplified MEA integration. Subgaskets having integrated MEAs may next be assembled between bipolar plates in a stack. If filling seal bead channels after stacking, the sealant material may be deposited into the seal bead channels to substantially fill them. In some embodiments, sealant material is deposited in at least some seal bead channels when assembled into the stack and allowed to cure. Once all seal bead channels in the subgaskets have formed seal beads, whether by depositing sealant material outside of the stack, in the stack, or both, the stack is compressed and tested for leaks.

If the microcellular polymeric foam sheet used was not a cross-linked polymer sheet, it may optionally be cross-linked (such as through use of gamma radiation, electron beam, or other suitable cross-linking process) in order to increase the strength and temperature capabilities of the subgasket. One of skill will be familiar with a variety of suitable cross-linking methods. In some embodiments, cross-linking may occur prior to or after thermoforming the foam sheet. Preferably, cross-linking occurs after thermoforming, thereby enabling recycling of the offal. In some embodiments, cross-linking occurs before MEA integration. Assuming that the MEA would not be damaged by the cross-linking method chosen, cross-linking may alternatively occur after MEA integration.

The described embodiments will be better understood by reference to the following examples which are offered by way of illustration and which one of skill in the art will recognize are not meant to be limiting.

As described, among the various embodiments of the present disclosure are microcellular polymeric foam subgaskets for fuel cells. Such subgaskets may, in some embodiments, comprise (i) an active region that is configured to frame a membrane electrode assembly when assembled therewith between a pair of fuel cell plates; (ii) a feed region comprising a manifold portion that conforms to anode, cathode, and coolant manifolds of the pair of plates; and (iii) at least one seal bead channel integrated into the polymeric foam and configured to receive and contain a seal bead material. Also provided among the various disclosed embodiments are fuel cells and fuel cell stacks comprising a provided subgasket.

Figure 2:
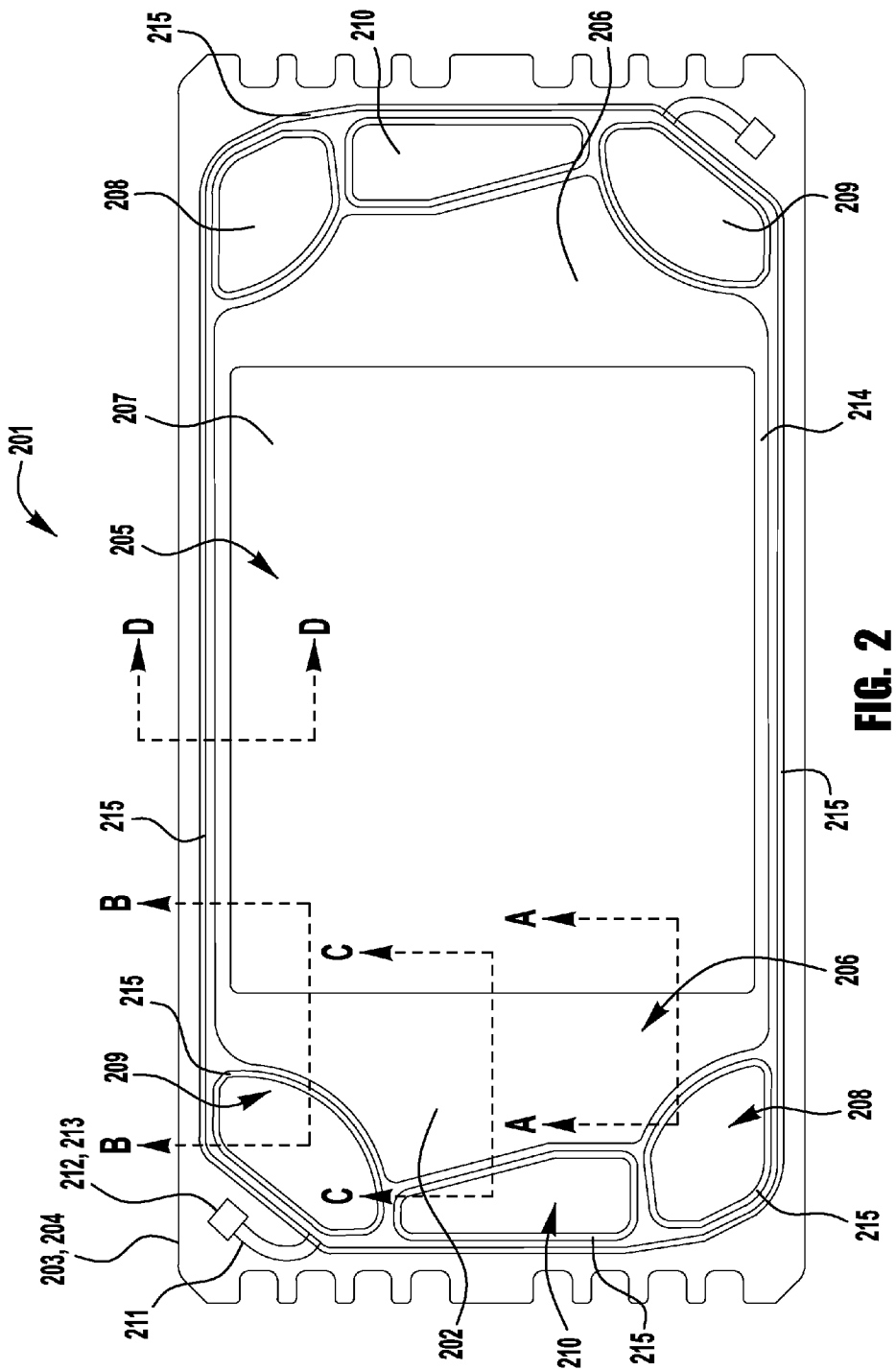
FIG. 2 is a top plan view of an exemplary fuel cell stack according to one embodiment of the disclosure, shown with a plate removed to expose a subgasket of the fuel cell stack.

FIG. 2 shows one example of a fuel cell stack 201 (shown with one plate removed) comprising a subgasket 202, a pair of bipolar plates 203 and 204 (not shown). Each plate 203, 204 and subgasket 202 has an active region 205 and a feed region 206. Disposed within the active region 205 is a membrane electrode assembly (MEA) 207. A typical MEA comprises a proton exchange membrane disposed between a cathode and an anode, wherein such MEA is positioned between a pair of gas diffusion media layers and all such components are positioned between bipolar plates. In some embodiments, the subgasket 202 comprises a portion 214 that overlaps and frames the active region 205. In some embodiments, the MEA 207 may be assembled together with diffusion media layers (not shown) and the subgasket 202 to form a unitized electrode assembly.

In addition to an active region 205, each plate 203, 204 and subgasket 202 comprise a feed region 206. Disposed within the feed region 206 are an anode manifold region 208, a cathode manifold region 209, and a coolant manifold region 210 for delivery and exhaust of anode gases, cathode gases, and coolant, respectively. The depicted fuel cell stack 201 further comprises at least one sprue 211 and at least one port 212 defined within the plates 203, 204, wherein the sprue 211 is in fluid communication with the port 212. The subgasket 202 comprises an aperture 213 for accommodating the port 212.

During assembly of a conventional fuel cell stack comprising a conventional subgasket, sealing of a cell is achieved using a multi-step process involving (i) providing a film-based subgasket material, (ii) shaping portions of it such that a cavity can be formed between the subgasket and plates, (iii) forming such cavity upon assembly of the stack, and (iv) filling the formed cavity with a sealant. In such a process, a cavity is not formed until the subgasket is disposed between the plates and the stack is at least partially compressed. A viscous sealant is next injected through a port and sprue combination that is in fluid communication with the cavity, and such sealant material fills and further forms the cavity. The compression is subsequently released in order to permit the sealant to expand, and the expanded sealant is cured to form a seal bead. The stack is then fully compressed, thereby sealing the components together. Curing conditions for the sealant are dependent upon the specific sealant selected. For example, curing may be performed at room temperature, elevated temperature, atmospheric pressure, reduced pressure, or combination thereof. Radiation, and chemical means (such as addition of a chemical cure material) may also be used for curing. On of skill will be familiar with a variety of suitable curing means.

Unlike a conventional subgasket, the provided subgasket 202 comprises preformed seal bead channels 215 integrated into the subgasket 202, thereby enabling a more simplified assembly and manufacture process for the provided fuel cells while providing other process and product benefits. For example, use of foamed polymer (instead of film) allows for greater flexibility in design of subgaskets and fuel cells, such as by eliminating trough and peak combinations. As another example, the presence of a preformed integrated channel 215 allows for greater placement accuracy and thus, a reduction of seal failure. Additionally, the presence of a preformed, integrated seal bead channel 215 allows for flexibility in how sealant material is deposited into the channel 215. In some embodiments, the sealant material may be injected into an assembled fuel cell stack 201 through a sprue 211 and port 212 combination that is in fluid communication with the channels 215. In other embodiments, the sealant material may be deposited into the channels 215 prior to stacking the cells. Curing could occur before or after stacking of the cells. In further embodiments, such processing flexibility allows for a combination of depositing sealant material prior to and after stacking of cells. For example, it is contemplated that certain channels 215 could be filled with sealant prior to stacking and the remaining channels 215 could be filled with sealant after stacking. In each of the aforementioned embodiments, curing conditions for the sealant are dependent upon the specific sealant selected. For example, curing may be performed at room temperature, elevated temperature, atmospheric pressure, reduced pressure, radiation, through chemical means, or a combination thereof.

Among the various disclosed embodiments, also provided are methods of manufacturing a subgasket for a fuel cell. Said methods may comprise (i) providing an extrusion based, microcellular polymeric foam sheet; (ii) heating the provided sheet to a pliable temperature; (iii) molding the sheet to at least have (a) an active region comprising a removable portion; (b) a feed region that conforms to the anode, cathode, and coolant manifolds of a pair of plates of the fuel cell, the feed region comprising a plurality of removable portions; and (c) at least one seal bead channel integrated into the polymeric foam and configured to receive and contain a seal bead material. The provided sheet may also be cross-linked before or after removing the removable portions.

Figure 3:
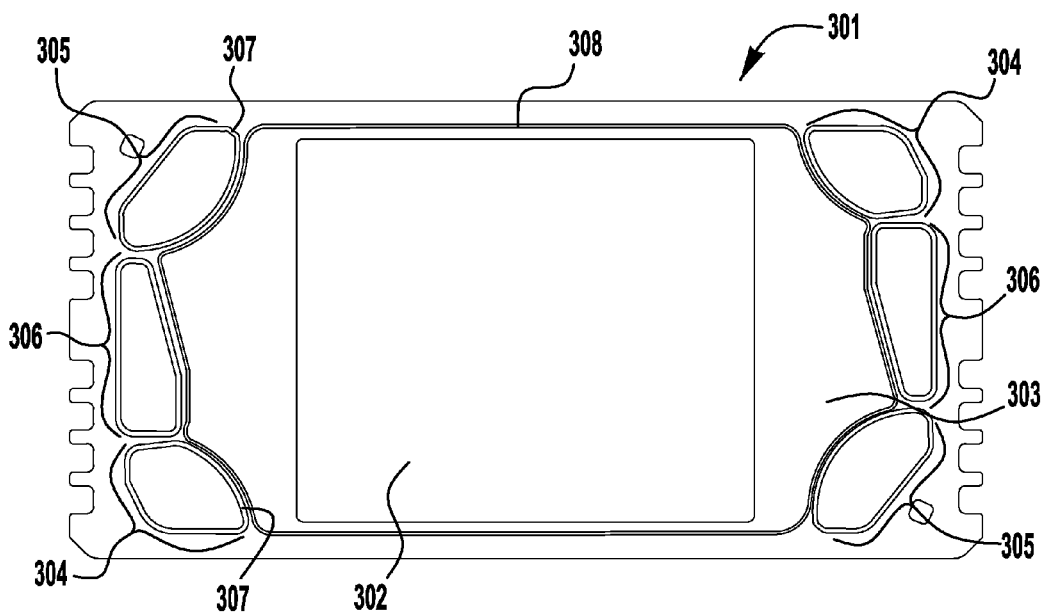
FIG. 3 is a top plan view of an exemplary subgasket having only seal bead channels formed therein.

FIG. 3 is a top plan view of one example of a provided subgasket 301 for use with a fuel cell (not shown). One of skill will recognize that such example is offered by way of illustration and the configuration of elements shown therein is not meant to be limiting; various changes may be made without departing from the scope of the invention. For example, there are a variety of fuel cell stack designs, and modifications that allow a provided subgasket to be used with such designs are contemplated and considered to be within the scope of the invention. Similarly, there are a variety of seal bead and seal bead channel patterns that are possible for each fuel cell design, and patterns that differ from the one shown in FIG. 3 are contemplated and considered to be within the scope of the invention.

The depicted subgasket 301 comprises regions that conform to bipolar plate features, including an active region 302 and feed region 303. The active region 302 is configured to, when assembled within a fuel cell stack, frame a MEA. One of skill will recognize that to manufacture such a subgasket 301, it is necessary to remove a portion of the polymeric foam material in order to leave a portion 302 that is capable of framing a MEA. In some embodiments, the subgasket 301 may also at least partially support the MEA. The feed region 303 comprises (i) an anode manifold region 304 that conforms to the anode manifold of the bipolar plates used, (ii) a cathode manifold region 305 that conforms to the cathode manifold of the bipolar plates used, and (iii) a coolant manifold region 306 that conforms to the coolant manifold of the bipolar plates used. As previously indicated, the present disclosure specifically contemplates variations in configuration of such elements. One of skill will recognize that to manufacture such a subgasket 301, it is necessary to remove a portion of the polymeric foam material in order to leave portions 304, 305, 306 that conform to the bipolar plates without obstructing manifold flow. In "conforming" to the bipolar plates, it is meant that the provided subgasket has a shape, thickness, and other features that are substantially similar to those of the plates. Thus, in some embodiments, the provided subgasket leaves few, if any, voids between the plates when assembled and sealed between the plates. Individually surrounding each manifold region 304, 305, 306 is a preformed seal bead channel 307 integrated within a portion of the subgasket 301 and configured to receive and contain a seal bead material. Each seal bead channel 307 may be continuous or discontinuous around the respective manifold region 304, 305, 306. For example, the seal bead channel 307 around an anode manifold region 307 may be a continuous channel that completely surrounds such region 307 (as shown). Alternatively, it is contemplated that a seal bead channel 307 around an anode manifold region 307 may be a discontinuous channel that nevertheless substantially surrounds such region 307. Framing the entire active region 302 and extending into a portion of the feed region 303 is an additional preformed seal bead channel 308 integrated into the subgasket 301 and configured to receive and contain a seal bead material. The foamed polymeric material therefore acts as a mold for the seal bead. Such additional seal bead channel 308 may be continuous or discontinuous and may have the same or different dimensions as the manifold seal bead channels 307. As shown, the additional seal bead channel 308 is a continuous integrated channel. As indicated, the seal bead channels 307, 308 may have the same or different dimensions. For example, all channels 307, 308 may have the same cross-sectional area, depth into the subgasket 301 material, or both. Alternatively, it is contemplated that at least one of the channels 307, 308 may have a cross-sectional area, depth into the subgasket material 301, or both, that differs from the other channels 307, 308. In some embodiments, it is contemplated that all channels 307, 308 have the same cross-sectional area and depth into the foamed subgasket 301 material. For example, the thickness of the subgasket 301 may be 0.05 mm (which is compressed to near solid polymer; approximately 100% density) at the thinnest portion of the seal bead channel 307, 308 and 1.0 mm (uncompressed) at the remainder of the subgasket 301. In some embodiments, at least some channels 307, 308 are in fluid communication with each other such that a viscous sealant material injected into one channel 307, 308 may flow into at least one other channel 307, 308. In such embodiments, injection may be through at least one port and sprue combination that is in fluid communication with such channels 307, 308. In some embodiments, it is not necessary for a port and sprue combination to be in communication with the channels 307, 308 because the seal bead material is deposited within the channels 307, 308 prior to assembly of the fuel cell stack.

Figure 4:
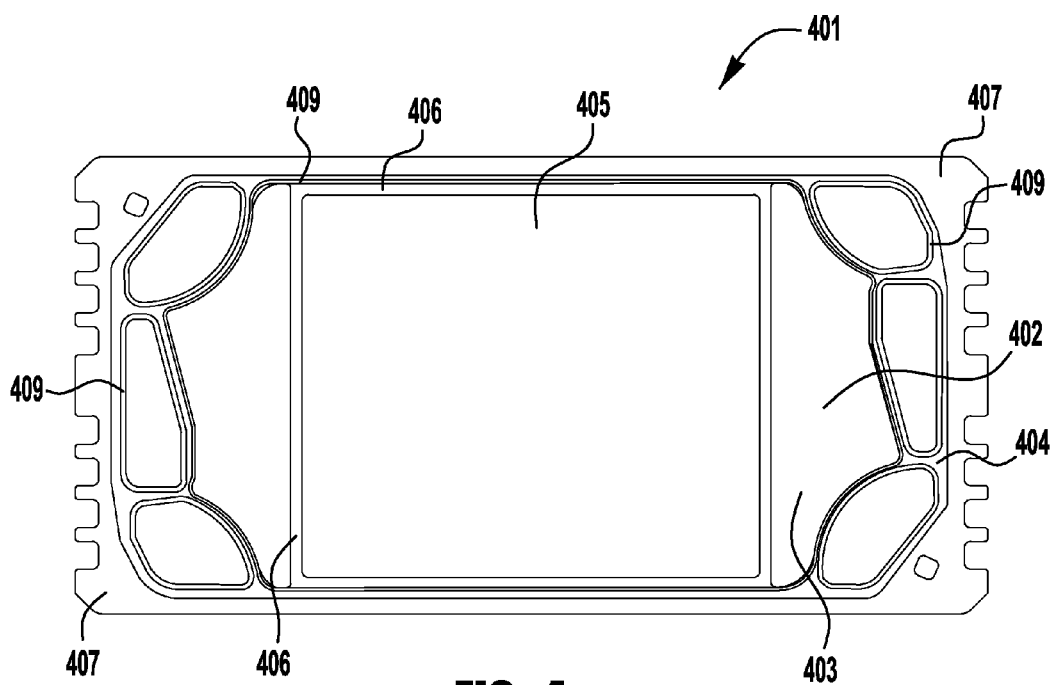
FIG. 4 is a top plan view of an exemplary subgasket having seal bead channels and other regions (such as overlap and feed regions) formed therein.

FIG. 4 is a top plan view of another example of a provided subgasket 401 for use with a fuel cell (not shown). One of skill will recognize that such example is offered by way of illustration and is not meant to be limiting and that various changes may be made without departing from the scope of the invention. The depicted subgasket 401 is similar to the subgasket shown in FIG. 3, but it comprises a variety of different thicknesses of material. As shown, the feed region 402 comprises a primary portion 403 and a manifold portion 404, wherein the primary portion 403 is thinner than the manifold portion 404. Additionally, the active region 405 comprises an overlap portion 406 that is thinner than the primary portion 403 of the feed region 402. Moreover, the subgasket 401 comprises a peripheral portion 407 that is thicker than the primary portion 403 of the feed region 402 but thinner than the manifold portion 404. As one example of such a subgasket, it is contemplated that an overlap portion 406 may have a thickness of 0.05 mm (which is compressed to near solid polymer; approximately 100% density), a primary portion 403 may have a thickness of 0.1 mm, a peripheral portion 407 may have a thickness of 0.2 mm, and a manifold portion 404 may have a thickness of 1.0 mm (uncompressed). The thinnest portion (not labeled) of the seal bead channels 408, 409 may also have a thickness of 0.05 mm.

Additionally provided among the various disclosed embodiments of the present disclosure are methods of sealing between plates of a fuel cell. Such methods may comprise (i) providing a pair of plates disposed in a stack; (ii) providing a membrane electrode assembly; (iii) providing an extrusion based, microcellular polymeric foam subgasket comprising (a) an active region that is configured to frame the membrane electrode assembly; and (b) at least one seal bead channel integrated into the polymeric foam and configured to receive and contain a seal bead material; (iv) disposing the provided subgasket and membrane electrode assembly between the pair of plates such that the membrane electrode assembly is framed by the active region of the subgasket; and (v) depositing a seal bead material into the at least one seal bead channel before disposing the subgasket between the pair of plates, after disposing the subgasket between the pair of plates, or both.

FIG. 5 illustrates one example of a fragmentary side cross-sectional view of an anode feed section of an exemplary fuel cell stack comprising a provided subgasket. For illustration of where such section might be found in a fuel cell stack, reference is made to A-A in FIG. 2. As shown, the fuel cell stack 501 comprises a pair of bipolar plates 502 (anode half plate), 503 (cathode half plate) with gas diffusion media 504 and a MEA 505 disposed between said plates 502, 503. The subgasket 506 is made of extrusion based, microcellular polymeric foam (such as that formed by the MuCell™ process) that is thermoformed to have integrated seal bead channels 507 formed within the header portion (not labeled) of the subgasket 506. Seal beads 508 and the overlap region 509 of the subgasket 506 are also shown, as is the flowpath 510 of anode gases. As previously described, the subgasket 506 comprises a preformed, integrated channel 507 configured to receive and contain a seal bead material 508, wherein the subgasket 506 is molded to near solid polymer (approximately 100% density) at the thinnest portion 511 of the channel 507. Around the channel 507, however, the subgasket 506 is thicker and conforms to the features of the bipolar plates 502, 503, leaving no voids. This further aids in sealing the stack 501 by blocking undesired flow. As one of skill will appreciate, the portion of the subgasket 506 that forms the overlap region 509 may also be molded to be thinner than other portions of the subgasket 506. This region 509 may also help to support the MEA.

FIG. 6 illustrates one example of a fragmentary side cross-sectional view of a cathode feed section of an exemplary fuel cell stack comprising a provided subgasket. For illustration of where such section might be found in a fuel cell stack, reference is made to B-B in FIG. 2. As shown, the fuel cell stack 601 comprises a pair of bipolar plates 602 (anode half plate), 603 (cathode half plate) with gas diffusion media (not labeled) and a MEA (not labeled) disposed between said plates 602, 603. The subgasket 604, integrated seal bead channel 605, and seal bead 606 are also shown. The flowpath 607 of cathode gases is also shown. As previously described, the subgasket 604 comprises an integrated channel 605 configured to receive and contain a seal bead material 606, wherein the subgasket 604 is compressed to near solid polymer (approximately 100% density) at the thinnest portion (not labeled) of the channel 605. Around the channel 605, the subgasket 604 is thicker and conforms to the features of the bipolar plates 602, 603. This further aids in sealing the stack 601 by leaving no voids and blocking undesired flow.

FIG. 7 illustrates one example of a fragmentary side cross-sectional view of a coolant feed section of an exemplary fuel cell stack comprising a provided subgasket. For illustration of where such section might be found in a fuel cell stack, reference is made to C-C in FIG. 2. As shown, the fuel cell stack 701 comprises a pair of bipolar plates 702, 703 with gas diffusion media (not labeled) and a MEA (not labeled) disposed between said plates 702, 703. The subgasket 704, integrated seal bead channel 705, and seal bead 706 are also shown. Around the channel 705, the subgasket 704 is thicker and conforms to the features of the bipolar plates 702, 703. This further aids in sealing the stack 701 by blocking undesired flow. The flowpath 707 of coolant is additionally shown.

FIG. 8 illustrates one example of a fragmentary side cross-sectional view of an edge section (non-nested design) of an exemplary fuel cell stack comprising a provided subgasket. For illustration of where such section might be found in a fuel cell stack, reference is made to D-D in FIG. 2. As shown, the fuel cell stack 801 comprises a pair of bipolar plates 802, 803 with gas diffusion media (not labeled) disposed between said plates 802, 803. The subgasket 804, integrated seal bead channel 805, and seal bead 806 are also shown. As depicted, each cell of the stack 801 has a discreet subgasket 804 (i.e., the subgasket 804 of cell A is separate from the subgasket 804' of cell B).

FIG. 9A illustrates an alternative example of a fragmentary side cross-sectional view of an edge section (nested design) of an exemplary fuel cell stack comprising a provided subgasket. As shown, cells of the fuel cell stack 901 comprise a pair of bipolar plates 902, 903 with gas diffusion media (not labeled) disposed between said plates 902, 903. The subgasket 904, integrated seal bead channel 905, and seal bead 906 are also shown. As depicted, two adjacent cells of the stack 901 sharing a subgasket 904 (i.e., the subgasket 904 of cell A is shared with cell B, and the subgasket 904' of cell C is shared with cell D) have seal beads 906 that touch only one shared plate 903. To achieve this design, a fan-folded subgasket 904 having preformed, integrated seal bead cavities 905 is utilized. For the cross-sectional view shown, the subgasket 904 is manufactured with seal bead cavities 905 on opposite sides of the subgasket 904, as depicted in FIG. 9B. One of skill will appreciate that the provided subgasket could be manufactured to be shared among all cells in the stack and that the present disclosure specifically contemplates the same.

FIG. 10A illustrates another example of a fragmentary side cross-sectional view of an edge section (nested design) of a fuel cell stack comprising a provided subgasket. As shown, the fuel cell stack 1001 comprises a pair of bipolar plates 1002, 1003 with gas diffusion media (not labeled) disposed between said plates 1002, 1003. The subgasket 1004, integrated seal bead channel 1005, and seal bead 1006 are also shown. As depicted, two adjacent cells of the stack 1001 sharing a subgasket 1004 (i.e., the subgasket 1004 of cell A is shared with cell B, and the subgasket 1004' of cell C is shared with cell D) have seal beads 1006 that touch both shared plates 1002, 1003. To achieve this design, a fan-folded subgasket 1004 having preformed, integrated seal bead cavities 1005 is utilized. For the cross-sectional view shown, the subgasket 1004 is manufactured with preformed seal bead cavities 1005 on the same side of the subgasket 1004, as depicted in FIG. 10B. This facilitates easier filling of seal bead channels 1005 in a continuous manufacturing process. One of skill will appreciate that the provided subgasket could be manufactured to be shared among all cells in the stack and that the present disclosure specifically contemplates the same.

Figure 11:
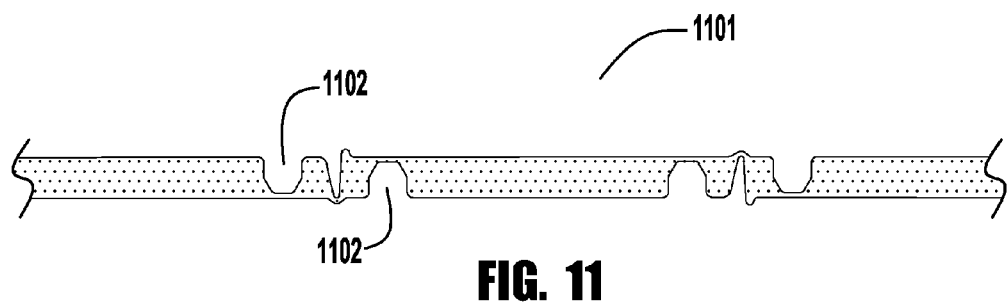
FIG. 11 shows a fragmentary side cross-sectional view of a subgasket (in unfolded configuration) that may be shared between three adjacent fuel cells in a stack.

As described with respect to FIGS. 9-10, two adjacent cells may share a subgasket. However, provided subgaskets may also be shared by more than two cells. One example of such a subgasket is depicted in FIG. 11, wherein the subgasket 1101 is manufactured with seal bead cavities 1102 on opposite sides of the subgasket 1101 and is configured to be shared between three adjacent cells.

This application should not be considered limited to the specific figures and examples described herein, but rather should be understood to cover all aspects of the invention. Various modifications, equivalent processes, as well as numerous structures and devices to which the present invention may be applicable will be readily apparent to those of skill in the art. Those skilled in the art will understand that various changes may be made without departing from the scope of the invention, which is not to be considered limited to what is described in the specification.

What is claimed is:

1. A fuel cell stack, comprising:
   a pair of plates disposed in a stack, the plates comprising an anode manifold, a cathode manifold, and a coolant manifold;
   a membrane electrode assembly disposed between the pair of plates; and
   an extrusion based, microcellular polymeric foam subgasket disposed between the pair of plates, the subgasket comprising:
   an active region that is configured to frame the membrane electrode assembly;
   a feed region comprising a manifold portion that conforms to the anode manifold, the cathode manifold, and the coolant manifold of the pair of plates;
   at least one seal bead channel integrated into the polymeric foam and configured to receive and contain a seal bead material; and
   a cured seal bead disposed in the at least one seal bead channel, the seal bead formed by depositing a seal bead material into the channel before disposing the subgasket between the pair of plates, after disposing the subgasket between the pair of plates, or both, and curing the seal bead material.

2. The fuel cell stack of claim 1, wherein each of said seal bead channels may have a cross-sectional area, cross-sectional shape, depth, or combination thereof, that is the same as or different from another of said seal bead channels.

3. The fuel cell stack of claim 1, wherein portions of the seal bead channel, feed region, active region, or combinations thereof, are molded to be thinner than other portions of the subgasket.

4. The fuel cell stack of claim 3, wherein the feed region comprises at least one portion having a thickness different from that of the manifold portion.

5. The fuel cell stack of claim 3, wherein the active region comprises a portion that partially overlaps the membrane electrode assembly.

6. The fuel cell stack of claim 5, wherein the active region comprises at least one portion having a thickness different from that of the overlap portion.

7. The fuel cell stack of claim 1, comprising a seal bead channel around the portion that conforms to the anode manifold, a seal bead channel around the portion that conforms to the cathode manifold, and a seal bead channel around the portion that conforms to the coolant manifold.

8. The fuel cell stack of claim 1, comprising a seal bead channel around the active region.

9. The fuel cell stack of claim 1, wherein the polymeric foam comprises a polymer selected from polyethylene and polypropylene, the selected polymer optionally being cross-linked.

10. The fuel cell stack of claim 1, configured to be shared between more than one fuel cell in a fuel cell stack.

* * * * *